United States Patent [19]

Ohta et al.

[11] Patent Number: 4,781,512
[45] Date of Patent: Nov. 1, 1988

[54] PALLET CHANGING SYSTEM FOR A MACHINE TOOL

[75] Inventors: Takeshi Ohta, Nishio; Tetsuro Yamakage, Anjoh, both of Japan

[73] Assignee: Toyoda Koki Kabushiki Kaisha, Kariya, Japan

[21] Appl. No.: 938,466

[22] Filed: Dec. 5, 1986

[30] Foreign Application Priority Data

Dec. 6, 1985 [JP] Japan .................. 60-275589

[51] Int. Cl.[4] .................................. B65G 1/06
[52] U.S. Cl. .................. 414/222; 198/465.1; 414/280; 414/661
[58] Field of Search ............ 414/222, 223, 225, 268, 414/269, 263, 277–280, 283, 672, 659–661; 29/33 P, 563, 568; 198/346.1, 465.1

[56] References Cited

U.S. PATENT DOCUMENTS

| | | | |
|---|---|---|---|
| 3,565,270 | 2/1971 | Guilbert, Jr. et al. | 414/661 X |
| 3,674,159 | 7/1972 | Lemelson | 414/278 X |
| 3,986,617 | 10/1976 | Blomquist | 198/346.1 X |
| 4,449,277 | 5/1984 | Hasegawa et al. | 198/346.1 X |
| 4,457,659 | 7/1984 | Watanabe | 414/223 |
| 4,480,738 | 11/1984 | Mattson | 198/346.1 |
| 4,492,504 | 1/1985 | Hainsworth | 414/280 X |
| 4,637,108 | 1/1987 | Murata et al. | 29/33 P |

FOREIGN PATENT DOCUMENTS

| | | | |
|---|---|---|---|
| 134160 | 3/1980 | Japan | 198/465.1 |
| 58-17717 | 4/1983 | Japan . | |
| 59-1131 | 1/1984 | Japan . | |
| 61-219557 | 9/1986 | Japan . | |

*Primary Examiner*—Robert J. Spar
*Assistant Examiner*—David A. Bucci
*Attorney, Agent, or Firm*—Oblon, Fisher, Spivak, McClelland & Maier

[57] ABSTRACT

A pallet changing system for a machine tool including a pallet changing device which is horizontally rotatable for exchanging a pallet on the work table of the tool with another pallet in a standby station. A plurality of pallet storing shelves are arranged in a plurality of concentric circular arrays and each shelf has a plurality of pallet supporting racks located one above another. The standby station forms a part of those circular arrays defining a central space surrounded by the racks. A rotary table is rotatably disposed in the center of that space. A pair of guide posts are upstanding from the rotary table. A structure is vertically movably supported on the posts. A pallet handling fork is provided on the structure horizontally movably to and away from the standby station. A pair of guide rails guide the horizontal movement of the fork. The fork has one end defining a pallet supporting portion. The system further includes a device for rotating the rotary table in an indexed way, a device for moving the vertically movable structure vertically and a device for moving the fork horizontally.

5 Claims, 7 Drawing Sheets

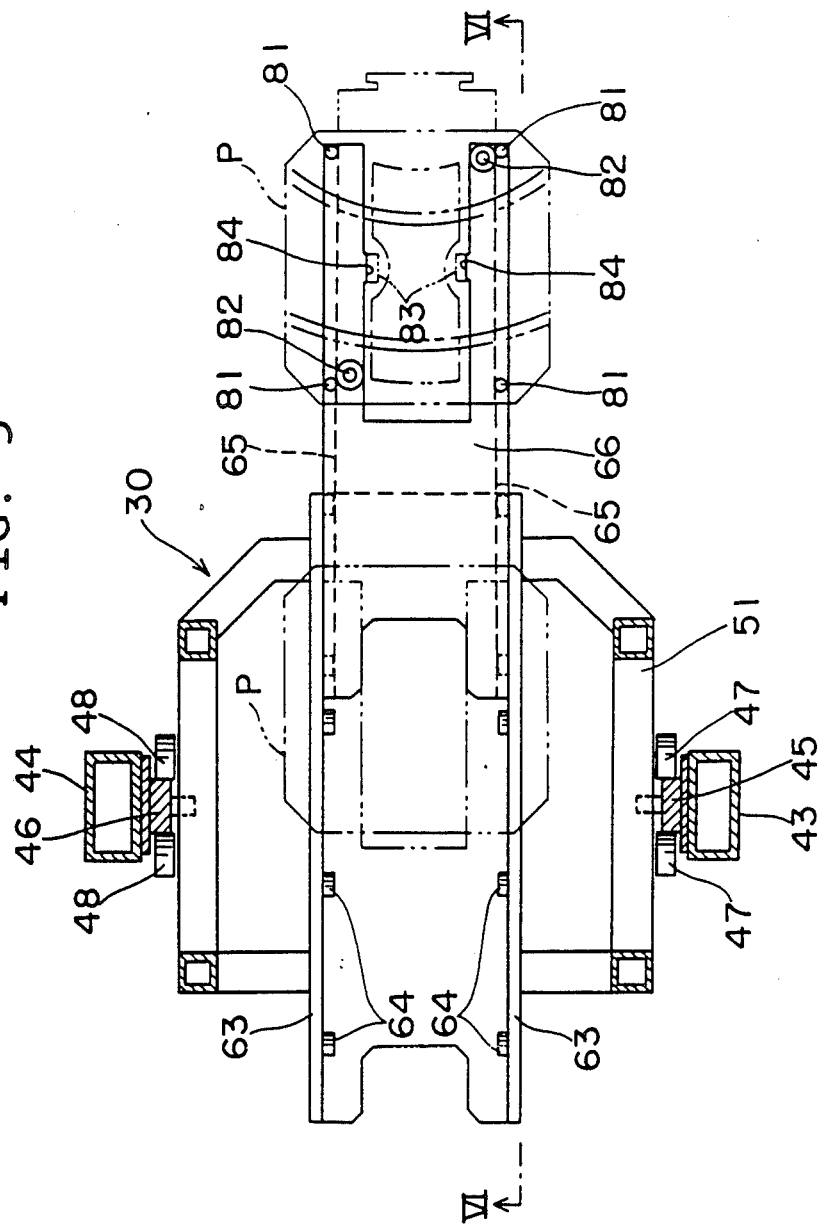

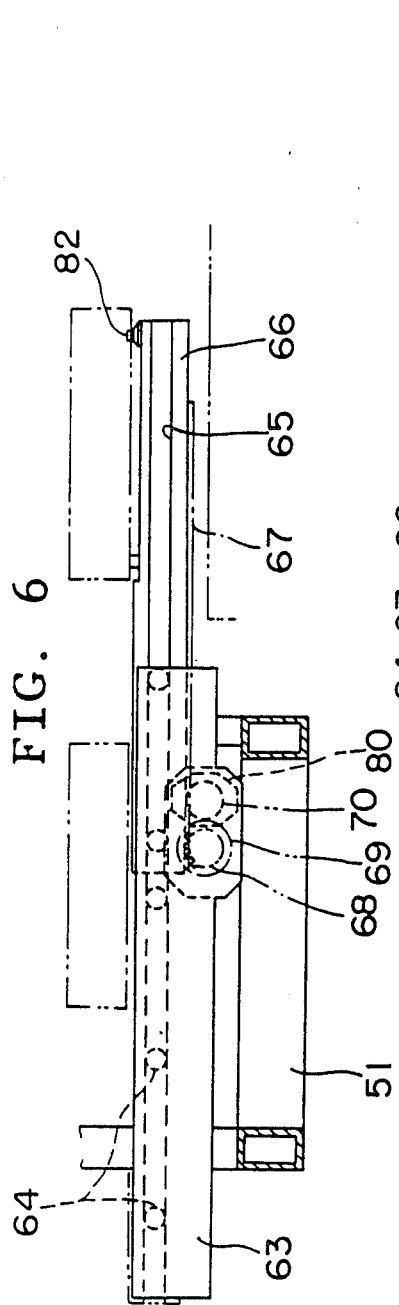
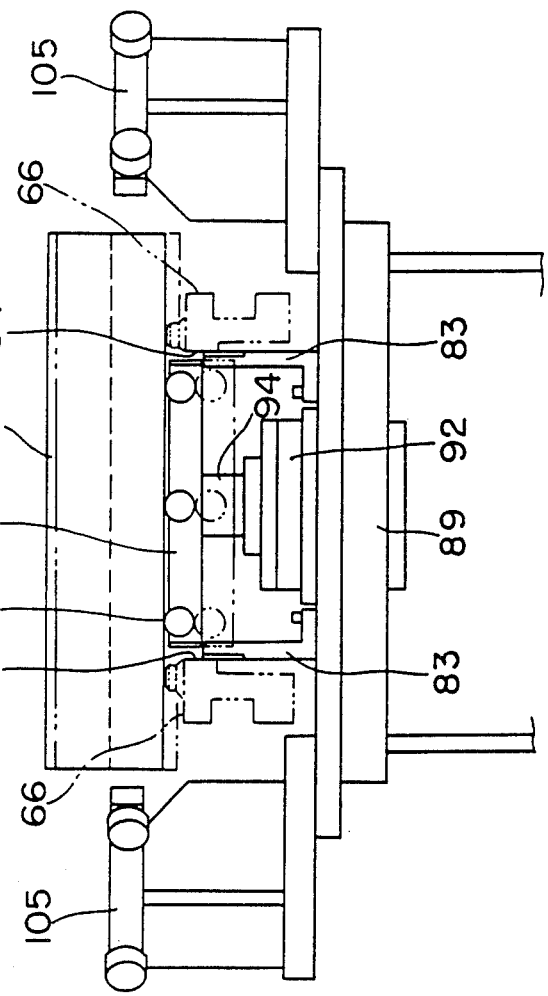

PALLET CHANGING SYSTEM FOR A MACHINE TOOL

BACKGROUND OF THE INVENTION

1. Field of the Invention

This invention relates to a system for supplying a plurality of pallets one after another to the machining center of a machine tool.

2. Description of the Prior Art

There are two ways of storing the pallets which are going to be supplied to the machining center of a machine tool. One of the ways is to stock a plurality of pallets in a horizontal plane and the other way is to stock them in a vertical plane or stack. The former has the disadvantage of requiring a very large floor space if a large number of pallets are stocked. The latter way has the advantage of requiring only a small floor space. Two systems are available for carrying it out. One of them includes a rotatable drum and an elevator installed outside the drum. The vertical movement of the elevator and the rotation of the drum in an indexed pattern are utilized for loading or unloading a particular pallet. The drum is very large and heavy. The pallets and the workpieces carried thereon add to the total weight of the load which must be rotated in an indexed pattern. It is difficult to rotate them quickly in an accurately indexed way. A drum having a larger radius is required for carrying a larger stock of pallets and makes more difficult the problem which has hereinabove been pointed out.

The other system includes a plurality of fixed racks arranged along a plurality of horizontal lines in a vertical plane. It requires a smaller floor space than the system including a drum. It, however, includes a stacker crane adapted for traveling along the racks to load or unload the pallets. This crane is expensive. Moreover, the traveling crane requires a floor space which is substantially equal to the space occupied by the racks. Therefore, the system still requires a considerably large floor space.

SUMMARY OF THE INVENTION

It is, therefore, an object of this invention to provide a pallet changing system for a machine tool which requires only a small floor space for installation, and which can quickly change a plurality of pallets one after another.

It is another object of this invention to provide a pallet changing system which can quickly be rotated horizontally for changing the pallets.

These objects are attained by a system which essentially comprises a plurality of fixed racks arranged in a plurality of circular arrays located one above another and a fork provided in the center of those circular arrays horizontally rotatably, vertically movably and longitudinally movably, while carrying a pallet at one end thereof.

The circular arrays of the racks having a sufficiently large diameter to enable the storage of a sufficiently large number of pallets and to provide in their center a sufficiently large space for the location of the fork. The location of the fork and other devices associated therewith within the space defined by the circular arrays enables the system of this invention to utilize the floor space more effectively than any system known in the art. It also enables a reduction in the weight of the fork and other devices associated therewith and thereby the quick rotation thereof in an accurately indexed way.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a sectional view taken along the line V—V of FIG. 2;

FIG. 6 is a sectional view taken along the line VI—VI of FIG. 5;

FIG. 8 is an elevational view taken along the line of an arrow B in FIG. 7; and

DETAILED DESCRIPTION OF THE INVENTION

Figure 1:
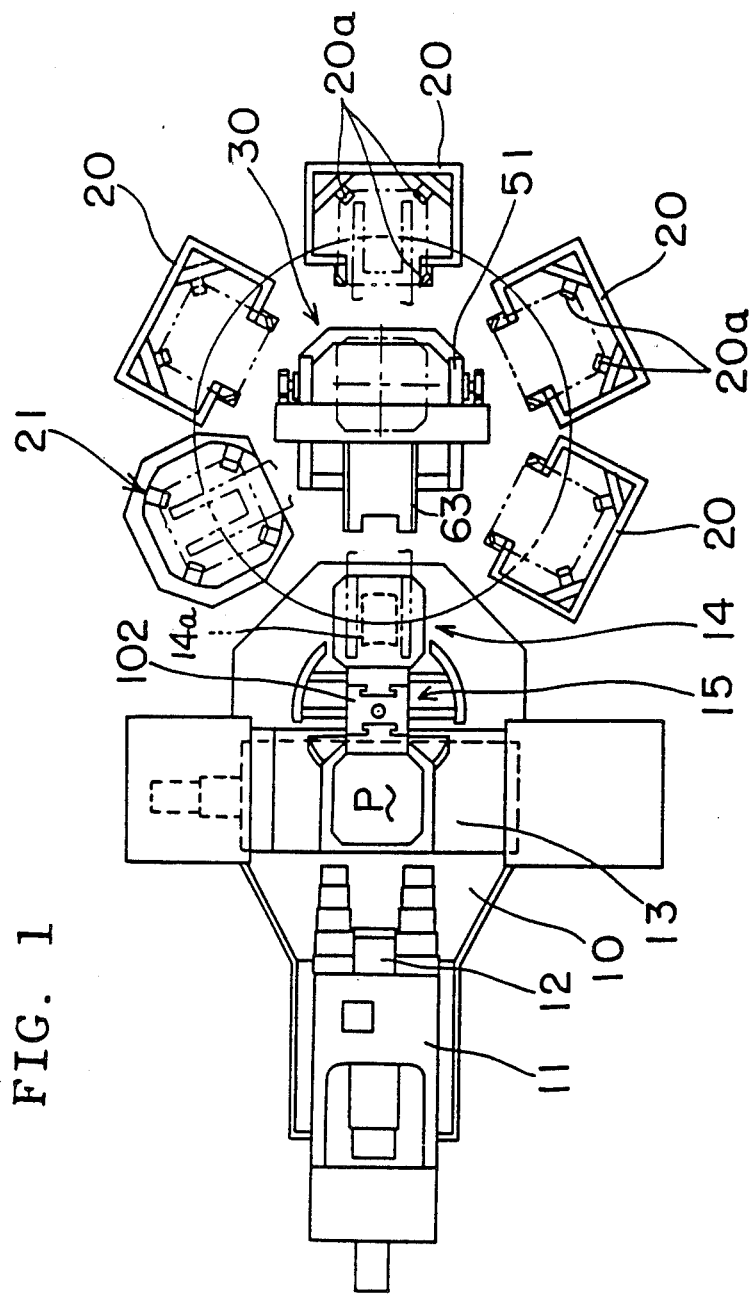
FIG. 1 is a top plan view of a system embodying this invention.

A system embodying this invention is generally shown in FIG. 1 with a machine tool having a bed 10, a column 11 supported slidably on the bed 10, a spindle head 12 supported vertically movably on the column 11 and a table 13 on which a pallet P is removably supported. The column 11 is horizontally movable to and away from the table 13. The system includes a pallet rest 14a defining a standby station 14, a pallet changing device 15, a plurality of shelves 20 each having a plurality of vertically spaced apart pallet racks and a loading and unloading station 21. The pallet changing device 15 is horizontally rotatable for exchanging the pallet P on the table 13 with another pallet on the pallet rest 14a. The racks of the shelves form a plurality of circular arrays of racks of which the pallet rest 14a forms a part.

Figure 2:
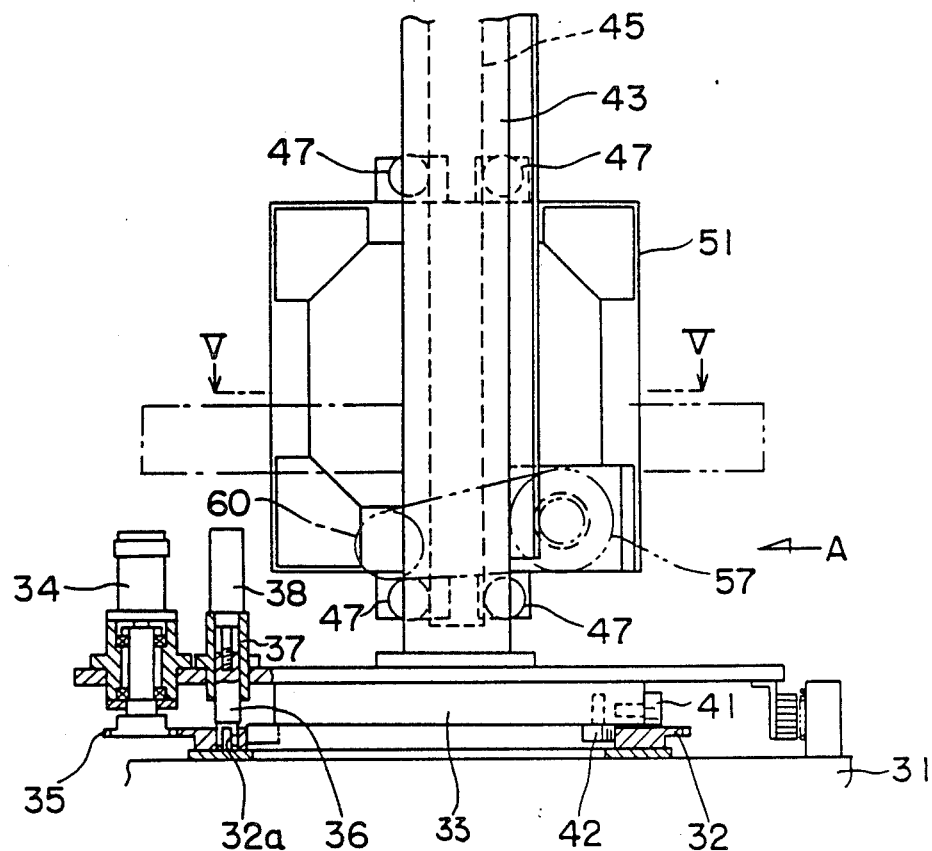
FIG. 2 is a front elevational view, partly in section, of a pallet loading and unloading device.
Figure 4:
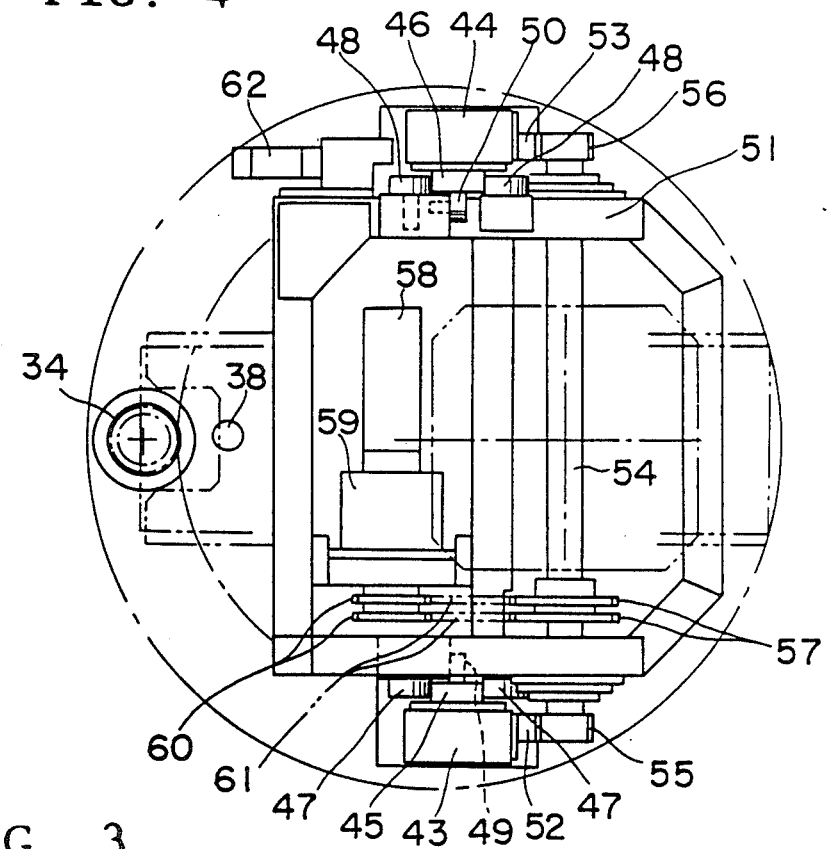
FIG. 4 is a top plan view of the device shown in FIG. 2.
Figure 3:
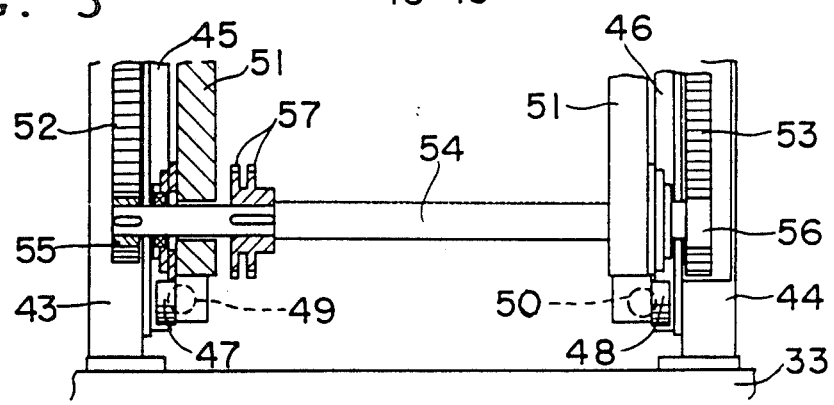
FIG. 3 is a side elevational view taken along the line of an arrow A in FIG. 2 and showing a mechanism for moving a vertically movable structure.

A pallet loading and unloading device 30 is provided in the center of the circular arrays of the shelves 20. The device 30 is shown in detail in FIGS. 2 and 3. A toothed wheel 32 is secured to a base 31 and has an upper surface and an inner peripheral surface which define guide surfaces for rollers 41 and 42. A rotary table 33 is rotatably supported by the rollers 41 and 42 on the guide surfaces of the toothed wheel 32. A pinion 35 connected to a motor 34 is rotatably supported on the rotary table 33 and meshes with the toothed wheel 32. The toothed wheel 32 has plural knock holes 32a. A knock pin 36 is provided in a guide tube 37 longitudinally movably into or away from the knock hole 32a. The knock pin 36 has an upper end to which a cylinder 38 is connected. A pair of guide posts 43 and 44 are upstanding from the rotary table 33. A pair of vertical rails 45 and 46 are secured to the mutually facing surfaces of the guide posts 43 and 44, respectively. A vertically movable structure 51 has a plurality of rollers 47 and 48 rotatably contacting both sides of the rails 45 and 46, respectively, and a plurality of rollers 49 and 50 contacting the mutually facing surfaces of the rails 45 and 46, respectively.

A rack bar 52 or 53 is secured to one side of each guide post 43 or 44, respectively. A shaft 54 is rotatably supported by the vertically movable structure 51. A pair of pinions 55 and 56 are provided at both ends, respectively, of the shaft 54 and mesh with the rack bars 52 and 53, respectively. A sprocket 57 is secured to the shaft 54 and connected by a chain 61 to a driving sprocket 60 which is adapted to be driven by a motor 58 and a speed reducer 59. A cylinder 62 is provided for preventing the vertically movable structure 51 from falling inadvertently. It has a member which is engageable with a stopper (not shown) to maintain the structure 51 at an appropriate level of height for handling the pallet on a particular rack in a particular shelf 20.

A pair of parallel guide rails 63 are horizontally supported on the structure 51, as shown in FIGS. 5 and 6. A plurality of rollers 64 are provided on each of the inner or mutually facing surfaces of the guide rails 63. A shift fork 66 has a pair of side grooves 65 in which the rollers 64 of the guide rails 63, respectively, are received. The fork 66 has a lower surface to which a rack bar 67 is secured. A pinion 68 meshes with the rack bar 67 and is operationally connected to a motor 80 by gears 69 and 70. The fork 66 has an upper surface which is provided at one end thereof with sheet members defining a pallet supporting surface and a plurality of pallet positioning pins 82. The pallet supporting portion of the fork 66 is so positioned as to be offset forward by an appropriate distance beyond the center of its rotation when the fork 66 has been retracted, so that it may have a small stroke of movement when delivering a pallet. The fork 66 has a bifurcated end portion defining a U-shaped inner periphery on which a pair of guide surfaces 84 are formed. The standby station has two guide projections 83 which are engageable with the guide surfaces 84, respectively, to position the fork 66 transversely in place when it has been advanced.

Reference is now made to FIG. 8 showing the delivery of the pallet P from the fork 66 to the standby station 14. The fork 66 carrying the pallet P as shown by two-dot chain lines is advanced and when it has approached the forward end of its stroke, its guide surfaces 84 engage the guide projections 83, whereby any transverse displacement of the fork is corrected. The standby station 14 has a pallet receiving member 90 which is in its lowered position as shown by two-dot chain lines. The pallet receiving member 90 is raised to its raised position as shown by solid lines for receiving the pallet P from the fork 66. The pallet changing device 15 has a hook member 102 with which two pallets are engageable, and each pallet has a projection 91 which is engageable with the hook member 102. The pallet P on the pallet receiving member 90 is now ready to replace the pallet on the table 13, as will hereinafter be described in detail.

Figure 7:
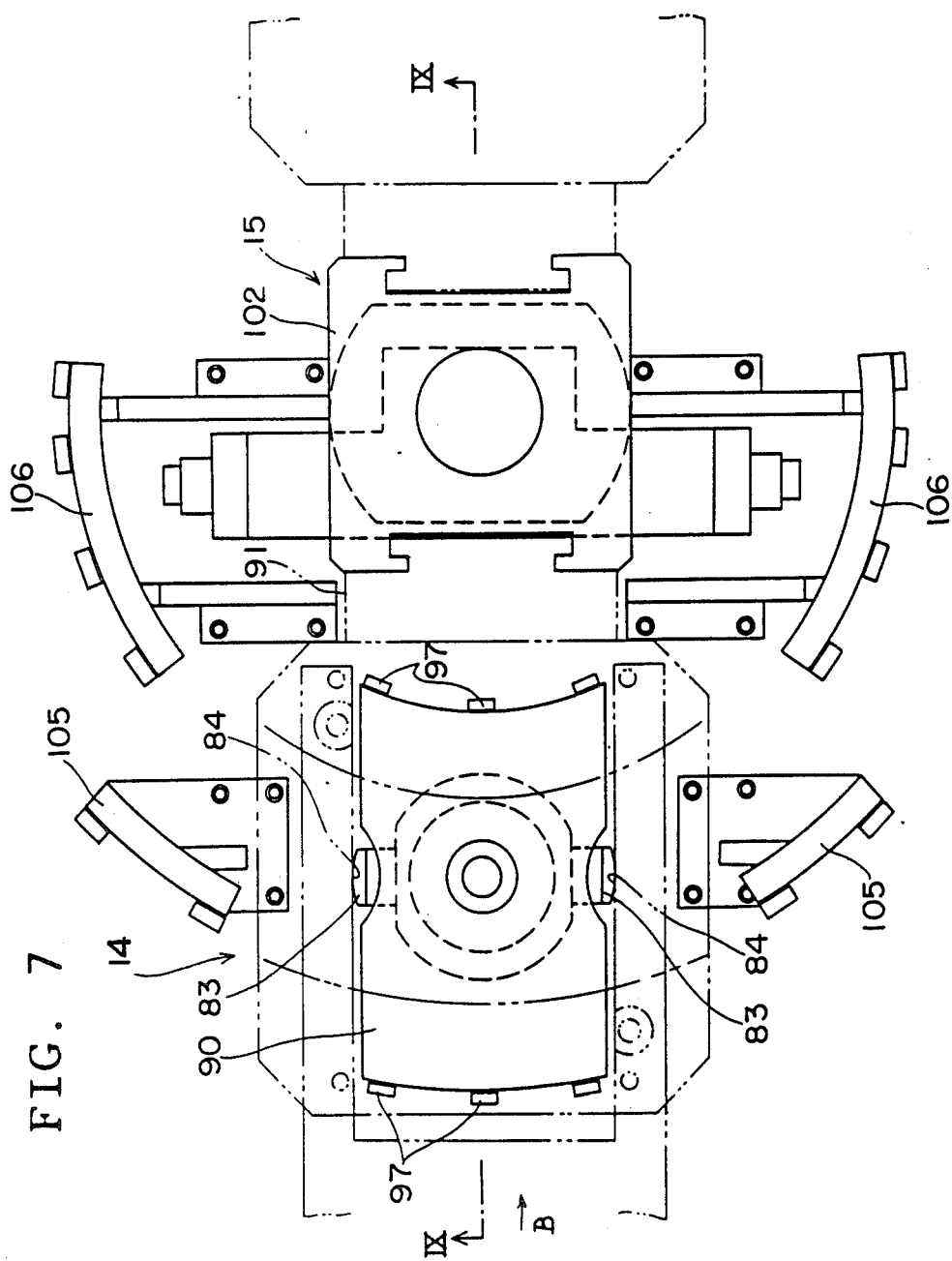
FIG. 7 is a top plan view of a pallet changing device.
Figure 9:
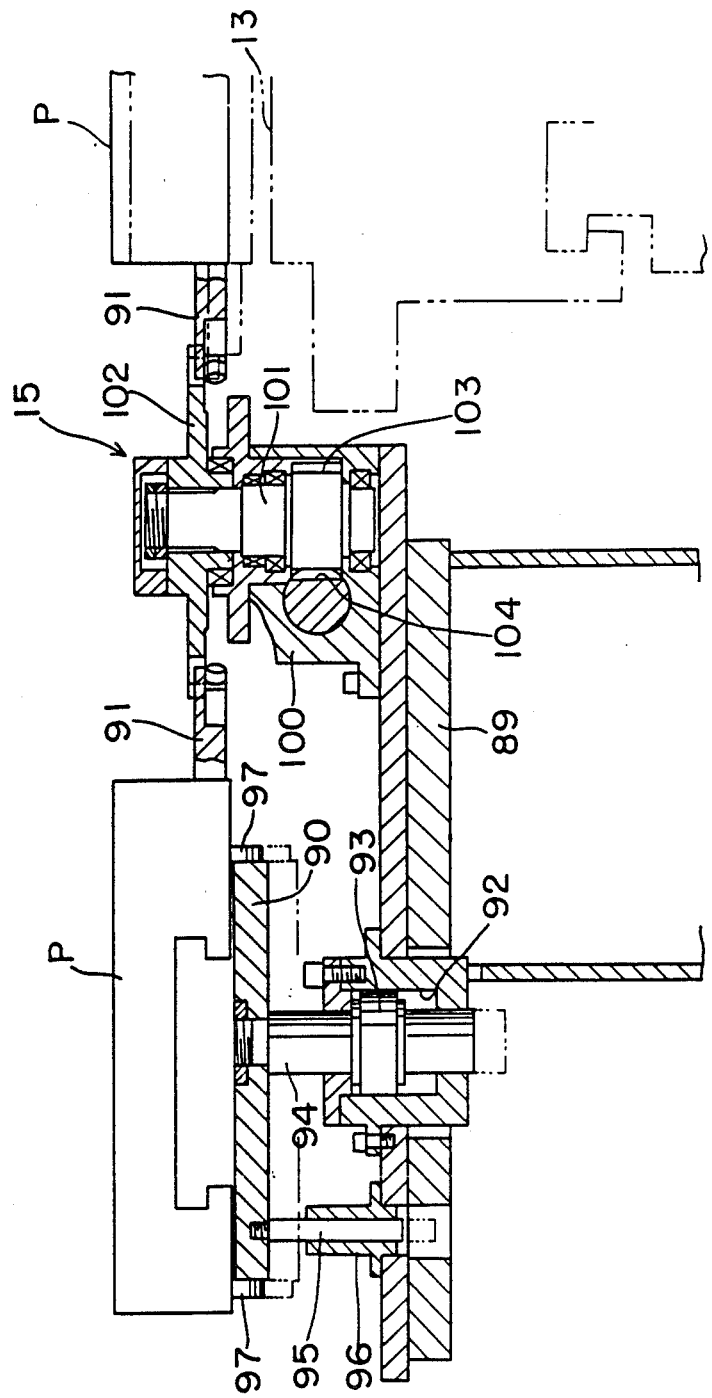
FIG. 9 is a sectional view taken along the line of IX—IX of FIG. 7.

The pallet changing device 15 will now be described in further detail with reference to FIGS. 7 to 9. The standby station 14 has a base 89 on which a cylinder 92 is provided for raising and lowering the pallet receiving member 90. The cylinder 92 contains a piston 93 and a piston rod 94 extending from the piston 93 is connected to the pallet receiving member 90. A guide rod 95 extends from the bottom of the pallet receiving member 90 and is held in a guide tube 96 so that the member 90 may not turn. The pallet receiving member 90 is provided at each of its front and rear ends with an arcuate array of rollers 97 on which the pallet P can rest. The pallet changing device 15 has a base 100 supported on the base 89 and supporting a vertical shaft 101 rotatably. The shaft 101 has an upper end to which the hook member 102 is secured. A pinion 103 is provided under the shaft 101 and meshes with a rack piston 104. The piston 104 is movable to rotate the hook member 102 by an angle of 180°. The pallet P on the machine table 13 is held by a pallet clamper (not shown) in its lowered position as shown by two-dot chain lines in FIG. 9 when the workpiece on the pallet is machined. When the pallet P on the table 13 is changed, however, the pallet clamper is raised and the projection 91 of the pallet P is engaged with the hook member 102. When the projections 91 of the two pallets P have both been engaged with the hook member 102, the hook member 102 is rotated by 180° so to transfer one of the pallets P from the table 13 to the standby station 14 and the other pallet P from the standby station 14 to the table 13. Then, the pallet clamper and the pallet receiving member 90 are lowered, whereupon the projections 91 of the two pallets 91 are both disengaged from the hook member 102 and the pallet P on the table 13 is lowered to the machining position. A plurality of arcuate supporting members 105 and 106 are provided for supporting the pallets P when the hook member 102 is rotating.

Description will now be made of the operation of the pallet loading and unloading device 30. The pallet P which has been transferred from the table 13 to the standby station 14 is raised by the pallet receiving member 90 and the fork 66 is advanced to a position below the pallet P. Then, the pallet receiving member 90 is lowered to transfer the pallet P onto the fork 66. The fork 66 is retracted, the rotary table 33 is rotated and the vertically movable structure 51 is raised or lowered to a position which is appropriate for the transfer of the pallet P to an empty rack 20a in one of the shelves 20. The structure 51 is positioned at a level of height slightly above the pallet supporting position of the rack 20a. Then, the fork 66 is advanced and the structure 51 is slightly lowered so that the pallet P may be transferred from the fork 66 to the rack 20a. After the fork 66 has been retracted again, the rotary table 33 is rotated and the structure 51 is raised or lowered to bring the fork 66 to a position which is appropriate for receiving from another rack the pallet P carrying the workpiece to be machined. The fork 66 is positioned slightly below the pallet supporting position of the rack and advanced until its pallet receiving portion is located below the pallet. Then, the structure 51 is slightly raised so that the fork 66 may receive the pallet from the rack. The fork 66 carrying the pallet thereon is retracted, rotated and raised or lowered to transfer the pallet to the standby station 14. The rotary table 33, the vertically movable structure 51 and the fork 66 are likewise operated for transferring the pallets to the loading and unloading station 21 or receiving them therefrom.

According to this invention, the location of the pallet loading and unloading device 30 in the space surrounded by the circular arrays of the shelves 20 makes it possible to utilize very effectively the floor space which is occupied by the system. The arrangement of a plurality of racks one above another in each shelf enables a small space to be effectively utilized for stocking a large number of pallets. As the pallet loading and unloading device 30 is rotatable and vertically movable and includes a fork which is movable to and away from any of the racks, the racks can be of the type which is stationary and is, therefore, inexpensive. The pallet loading and unloading device, which is rotatable, is greatly smaller in weight than any conventional structure of the type in which a shelf or shelves carrying a plurality of pallets are rotated. The device can, therefore, be rotated quickly and positioned accurately, as opposed to any such conventional structure.

Obviously, numerous modifications and variations of the present invention are possible in light of the above teachings. It is therefore to be understood that within the scope of the appended claims, the invention may be practiced otherwise than as specifically described herein.

What is claimed is:

1. In a pallet changing system for a machine tool for exchanging a pallet on a work table, the improvement which comprises:
    a plurality of pallet storing shelves arranged in a plurality of concentric circular arrays and each having a plurality of pallet supporting racks located one above another, said arrays defining a central space surrounded by said racks;
    a rotary table disposed rotatably in the center of said space;
    a pair of guide posts upstanding from said rotary table;
    a structure supported vertically movably on said posts;
    a pallet handling fork provided on said structure horizontally movably to and away from a standby station;
    a pair of guide rails along which said fork is horizontally movable;
    said fork having one end defining a pallet supporting portion;
    means for rotating said rotary table in an indexed way;
    means for moving said vertically movable structure vertically;
    means for moving said fork horizontally;
    a pallet changing device including a hook member which is rotatable about a vertical shaft between said work table and said standby station, and which has a pair of opposite ends each engageable with one of the pallets, and means for rotating said hook member;
    said standby station forming a part of said circular arrays and having a pallet receiving means for supporting a pallet, said pallet receiving means vertically adjustably supporting said pallet at a standby position and a vertically different position for further transfer by said hook member, and pallet guide means provided between said work table of said machine tool and said standby station for guiding pallets along a circular track.

2. A system as set forth in claim 1, wherein said standby station includes means for raising said pallet receiving means to enable it to receive a pallet from said fork, while causing said pallet to engage one of said ends of said hook member, said means for raising said pallet receiving including means for lowering said pallet receiving to disengage said pallet from said end of said hook member and transfer it to said fork.

3. A system as set forth in claim 2, wherein said pallet supporting portion of said fork is bifurcated and defines an inner periphery; and wherein said pallet changing device includes fork guide means provided in said standby station for engaging said inner periphery of said fork portion upon movement of said fork to said standby station to position said fork appropriately relative to said standby station.

4. A system as set forth in claim 2, wherein said pallet receiving means is provided with a plurality of rollers adapted to contact the pallet on said pallet receiving means to facilitate the horizontal movement of said pallet by said hook member.

5. A system as set forth in claim 4, wherein said pallet guide means consists of a plurality of rollers adapted to contact the bottoms of two pallets transferred from said pallet receiving means to said work table and from said work table to said pallet receiving means, respectively, by the horizontally rotation of said hook member to facilitate the transfer of said pallets.

* * * * *